United States Patent [19]

Shadbourne

[11] 4,377,070
[45] Mar. 22, 1983

[54] TURBOCHARGER CONTROL ACTUATOR

[75] Inventor: Alan P. Shadbourne, Torrance, Calif.

[73] Assignee: The Garrett Corporation, Los Angeles, Calif.

[21] Appl. No.: 159,191

[22] Filed: Jun. 13, 1980

[51] Int. Cl.³ .............................................. F02B 37/12
[52] U.S. Cl. .................................................... 60/602
[58] Field of Search .................. 60/600, 601, 602, 603

[56] References Cited

U.S. PATENT DOCUMENTS

| 3,195,805 | 7/1965 | Cholvin et al. ............... | 60/602 X |
| 3,233,403 | 2/1966 | MacInnes et al. .............. | 60/600 |
| 3,257,796 | 6/1966 | Updike ........................ | 60/602 |
| 4,075,849 | 2/1978 | Richardson ................... | 60/602 |
| 4,203,296 |        | Tanaka et al. ................. | 60/602 |
| 4,270,356 | 6/1981 | Will et al. .................... | 60/602 |

Primary Examiner—Michael Koczo
Attorney, Agent, or Firm—Stuart O. Lowry; Joseph A. Yanny; Albert J. Miller

[57] ABSTRACT

A control actuator for a turbocharger comprises a pressure responsive diaphragm for controlling operation of a turbocharger waste gate valve in response to compressor inlet pressure during part load engine operation, and in response to tubine inlet pressure during full load engine operation.

24 Claims, 4 Drawing Figures

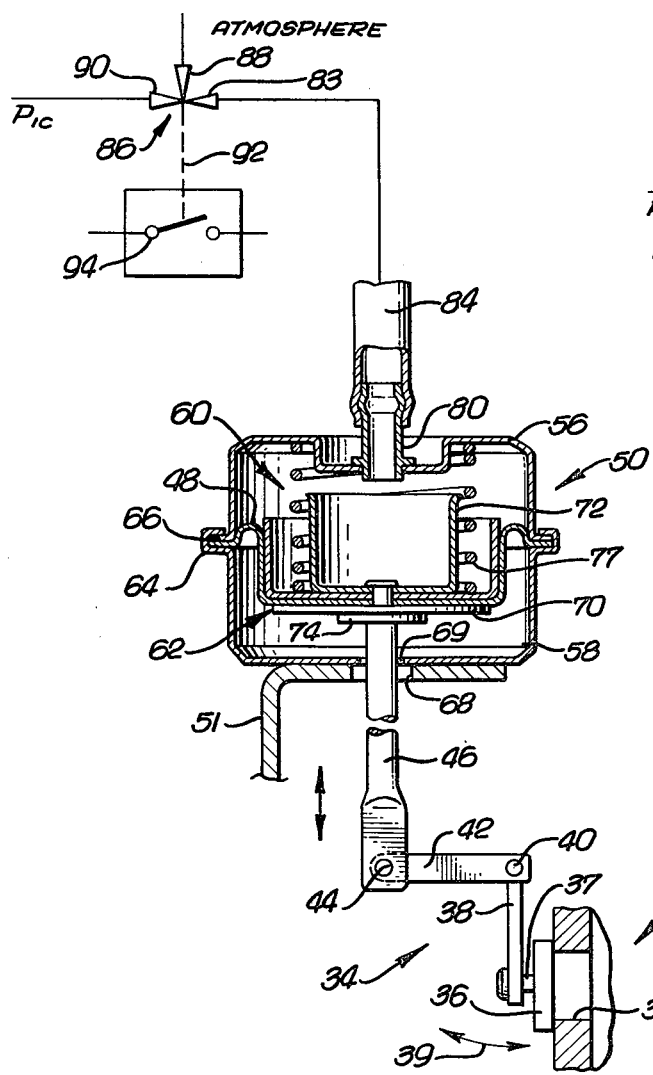
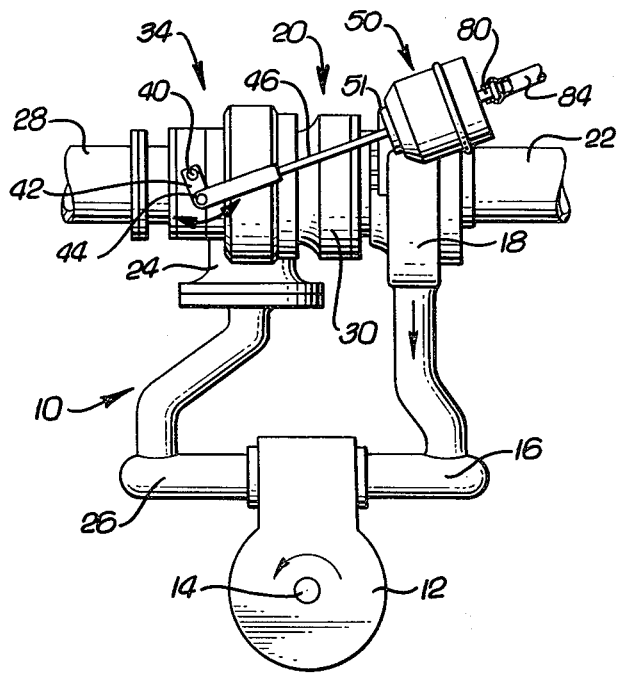
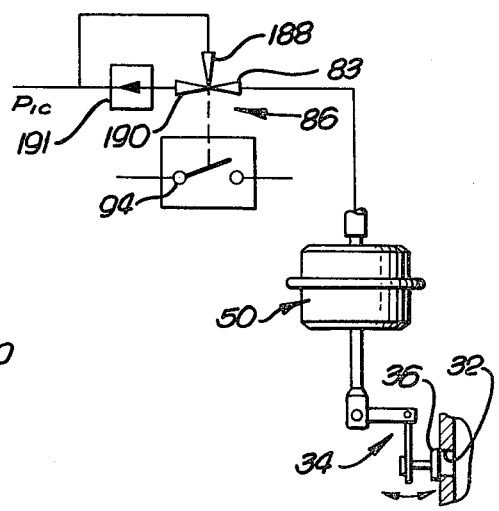
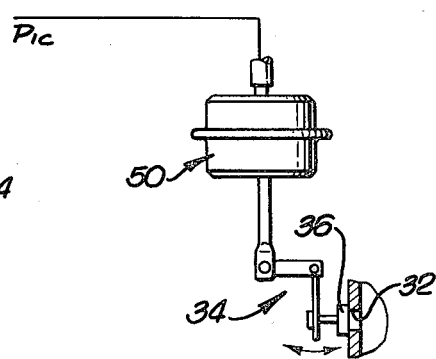

TURBOCHARGER CONTROL ACTUATOR

BACKGROUND OF THE INVENTION

This invention relates to turbochargers for supplying relatively high pressure charge air to an internal combustion engine. More specifically, this invention relates to a turbocharger control actuator designed for improving engine efficiency during steady state cruise or part load operation, while at the same time providing protection against turbocharger overboost.

Turbochargers in general are well known in the art, and typically comprise a turbine wheel and a compressor wheel mounted on a common shaft and carried within isolated turbine and compressor housings. The turbine housing includes a gas inlet and a gas outlet, and is coupled to the exhaust gas manifold of a combustion engine for circulation of the exhaust gases through the turbine housing to rotatably drive the turbine wheel. In turn, the turbine wheel rotatably drives the compressor wheel which compresses ambient air and supplies the resultant so-called compressed charge air to the intake manifold of the engine. Importantly, in a vehicle application, the gas outlet of the turbine housing typically is coupled to exhaust system conduits which may include pollution and/or noise abatement equipment.

The use of turbocharged engines is highly advantageous when compared with conventional naturally aspirated engines in that substantially higher density fuel-air mixtures may be delivered to the combustion chamber or cylinders of the engine. This increased fuel-air density results in substantially improved engine performance and efficiency. However, with many internal combustion engines, it is desirable to limit the maximum pressure or boost pressure at which charge air may be delivered to the engine at full load engine operating conditions. That is, many turbochargers are capable of delivering charge air to the engine at a boost pressure substantially greater than the engine or the turbocharger can withstand. Accordingly, a wide variety of valves and other pressure control devices have been proposed to limit the maximum boost pressure of charge air supplied by the turbocharger compressor.

Turbocharger boost controls typically comprise controlled valve arrangements for bleeding off a portion of the compressed charge air, or alternately, for opening a bypass flow path around the turbine wheel for bypass of a portion of the engine exhaust gases out of driving communication with the turbine wheel. This latter arrangement utilizes a so-called waste gate valve controllable for limiting the maximum allowable rotational speed of the turbine wheel in order to limit correspondingly the maximum allowable rotational speed of the compressor wheel, and thereby limit the maximum boost pressure of the charge air supplied to the engine. Structurally, these waste gate valve arrangements include a control actuator responsive to engine or turbocharger parameters to control opening and closing of the waste gate valve. These control actuators are available in a variety of specific constructions and can be made responsive to any of a selected number or combination of parameters, such as compressor inlet pressure, compressor discharge pressure, turbine inlet pressure, or the like. For example, many actuators are available including a pressure-responsive diaphragm for controlling the position of the waste gate valve. In some designs, a spring biases the valve to a closed position preventing bypass of exhaust gases around the turbine wheel until compressor discharge pressure reaches a predetermined magnitude. See, for example, U.S. Pat. Nos. 1,310,683; 2,480,621; 2,878,797; 3,035,408; 3,195,805; 3,421,314; 3,931,712; and 4,005,579. Other designs utilize a spring to bias the valve to an open position, and couple the valve to a diaphragm responsive to parameter-indicative pressures to maintain the valve closed against the spring bias until compressor discharge pressure reaches a predetermined magnitude. See, for example, U.S. Pat. Nos. 2,374,708; 3,089,304; 3,102,382; 3,104,520; 3,233,403; 3,257,796; 3,611,711; and 4,005,578.

In these various diaphragm-controlled pressure responsive waste gate valve arrangements of the prior art, the waste gate valve in maintained in a closed position preventing bypass of exhaust gases around the turbine wheel whenever compressor discharge pressure is at or below the predetermined maximum allowable magnitude. This is desirable during substantially full load, transient operation such as acceleration in that the exhaust gases drivingly rotate the turbine wheel so that the turbocharger develops substantial boost pressure. However, during part load steady state cruise operation of the engine, substantial turbocharger boost pressure is not required, and it is therefore desirable to open the turbocharger waste gate valve to unload the turbocharger from the engine. That is, it is desirable during this part load condition to bypass exhaust gases around the turbine wheel to reduce back-pressure on the engine, and thereby correspondingly improve engine efficiency and economy. However, in the prior art, control actuators for controlling the position of a waste gate valve have not been designed for the dual purpose of preventing turbocharger overboost, as well as for opening the waste gate valve during part load cruise operation.

The present invention overcomes the problems and disadvantages of the prior art by providing an improved turbocharger control actuator for opening a turbocharger waste gate valve during part load operation, and whenever compressor boost pressure reaches a predetermined maximum value.

SUMMARY OF THE INVENTION

In accordance with the invention, a turbocharger comprises a turbine wheel and a compressor wheel mounted on a common shaft and carried within separate turbine and compressor housings, respectively. The turbine housing is coupled to the exhaust gas manifold of an internal combustion engine, and includes a gas inlet and a gas outlet for the circulation of engine exhaust gases into and through the turbine housing to drivingly rotate the turbine wheel. The turbine wheel in turn drives the compressor wheel which supplies compressed charge air to the intake manifold of the engine. A bypass flow path is provided in the turbine housing for bypass passage of a portion of the exhaust gases around the turbine wheel, and a waste gate valve is movable to open and close the bypass flow path to limit turbocharger rotational speed and thereby control the pressure level of the charge air provided by the compressor wheel.

A turbocharger control actuator comprises an actuator rod having one end coupled to the waste gate valve, and its opposite end movably controlled by a pressure responsive diaphragm. The diaphragm is carried within an actuator housing to define a pressure chamber between the diaphragm and the housing, and is biased by a spring to urge the waste gate valve to a position closing the bypass flow path. Compressor inlet pressure comprises a substantial vacuum during part load or steady state cruise operation of the engine, and is coupled to the pressure chamber to draw the diaphragm against the spring bias to move the waste gate valve to an open position. However, during substantially full load engine operation, the compressor inlet pressure approaches ambient pressure to allow the spring bias to return the waste gate valve to a position closing the bypass flow path. Importantly, the spring is designed to provide a biasing force which is overcome by turbine inlet pressure acting directly upon the waste gate valve to open the valve whenever the turbine inlet pressure reaches a predetermined maximum magnitude.

BRIEF DESCRIPTION OF THE DRAWINGS

The accompanying drawings illustrate the invention. In such drawings:

FIG. 1 is a diagrammatic view illustrating a turbocharger engine system including a turbocharger control actuator of this invention;

FIG. 2 is an enlarged fragmented section of the actuator shown schematically coupled to the engine for operation;

FIG. 3 is a schematic illustration of an alternate arrangement of the invention; and FIG. 4 is a schematic illustration of another alternate arrangement of the invention.

DETAILED DESCRIPTION OF THE PREFERRED EMBODIMENT

A turbocharged engine system 10 is shown in FIG. 1, and generally comprises a combustion engine 12 such as an internal combustion engine or diesel-powered engine having a plurality of combustion cylinders (not shown) for rotatably driving an engine crankshaft 14. The engine 12 includes an air intake conduit or manifold 16 through which air is supplied by means of a compressor 18 of a turbocharger 20. In operation, the compressor 18 draws in ambient air through an air inlet 22, and compresses the air with a rotatable compressor wheel (not shown) to form so-called charge air for supply to the engine for combustion.

Exhaust products are discharged from the engine through an exhaust conduit or manifold 26 for supply to a turbine 24 of the turbocharger 20. The discharged exhaust gases rotatably drive a turbine wheel (not shown) within the turbine 24 at a relatively high rotational speed to correspondingly drive the compressor wheel within the compressor 18. In this regard, the turbine and the compressor wheels are carried for simultaneous rotation on a common shaft (not shown) supported within a center housing 30. After driving communication with the turbine 24, the exhaust gases are discharged from the turbocharger 20 through an exhaust conduit 28 which may conveniently include pollution or noise abatement equipment.

As illustrated in FIG. 2, the turbine 24 includes means forming a bypass flow path 32. This bypass flow path 32 comprises an opening or bleed hole defining a flow passage for a portion of the exhaust gases through the turbine 24 without drivingly communicating with the turbine wheel. Importantly, since the general formation of such a bypass flow path is well known in the art, specific construction details are not shown or described herein. However, one preferred bypass flow path arrangement is shown and described in U.S. Pat. No. 4,120,156.

The bypass flow path 32 is controllably opened and closed by a waste gate valve assembly 34 including a turbocharger control actuator 50 of this invention. More specifically, a waste gate valve 36 comprising a generally disk-shaped valve head is relative loosely carried by a stem 37 on a pivoting swing arm 38. The swing arm 38 is secured to a pivot pin which is mounted on the turbine 24 in a suitable manner for rotation about its own axis. Importantly, the valve 36 and the swing arm 38 are arranged so that the valve 36 is movable as illustrated by arrow 39 between a first position closing the bypass flow path 32 to exhaust gas flow, and a second position opening the bypass flow path 32 to exhaust gas flow. Of course, when the bypass flow path 32 is closed, all of the engine exhaust gases are circulated through the turbine 24 in driving communication with the turbine wheel whereby the turbocharger is capable of developing substantial charge air boost pressure. However, when the bypass flow path 32 is opened, a portion of the engine exhaust gases bypass the turbine wheel whereby the ability of the turbocharger to develop substantial charge air boost pressure is limited.

As shown in FIG. 2, the position of the waste gate valve 36 is controlled by a crank arm 42 connected between the pivot pin 40, and one end of an actuator rod 46 by means of an additional pivot pin 44. This actuator rod 46 has its opposite end received within the turbocharger control actuator 50 of this invention for pressure responsive movement in response to engine or turbocharger operating conditions. That is, the actuator rod 46 is controlled to move downwardly as viewed in FIG. 2 whenever substantial boost pressure is desired to swing the waste gate valve 36 into its first position closing the flow path 32 to bypass gas flow. However, when it is desired to unload the turbocharger from the engine, or alternatively to limit boost pressure to a maximum predetermined valve, the actuator rod 46 is controlled to move upwardly as viewed in FIG. 2 to swing the waste gate valve 36 toward its second position opening the flow path 32 to bypass gas flow.

The turbocharger control actuator 50 comprises a generally canister shaped housing formed from upper and lower complementary housing halves 56 and 58, respectively, with the lower housing half 58 having a bracket 51 secured thereto for mounting the actuator on the turbocharger 20. A flexible, resilient convoluted diaphragm 48 is carried within the actuator housing, and has its periphery sealingly secured between the housing halves 56 and 58 to divide the housing into an upper chamber 60 and a lower chamber 62. Conveniently, as shown, the periphery of the diaphragm 48 is received between outwardly radiating flanges 66 and 64 on the upper and lower housing halves 56 and 58, and the lower flange 64 is crimped over the upper flange 66 to form the canister shaped housing with the diaphragm 48 mounted therein.

The actuator rod 46 extends into the actuator housing through relatively large aligned openings 68 and 69 formed in the bracket 51 and the lower housing half 58. The actuator rod 46 extends further through the lower housing chamber 62 for connection centrally to the resilient diaphragm 48. More specifically, the rod 46 has a rigid washer 74 secured near its end within the housing for engagement with one side of the diaphragm 48. The rod 46 extends from the washer 74 through the diaphragm, and includes a radially enlarged staked end 76 whereby the diaphragm is retained between the washer 74 and the staked end 76. For added strength, as shown in FIG. 2, the washer 74 and the staked end 76 also secure against the diaphragm 68 a central reinforcing plate 70 within the lower chamber 62, and an upwardly open cup-shaped piston 72 within the upper chamber 60.

A compression spring 77 is received within the upper chamber 60 of the actuator 50 for reaction between the upper housing half 56 and the cup-shaped piston 72. The compression spring 77 functions to urge the diaphragm 48 downwardly as viewed in FIG. 2 within the actuator. This correspondingly urges the actuator rod 46 downwardly to pivot the crank arm 42 so that the waste gate valve 36 moves to a normal position closing the bypass flow path 32. In this position, engine exhaust gases are circulated through the turbine 24 in driving communcation with the turbine wheel to enable the turbocharger to develop substantial boost pressure.

A port fitting 80 is secured to the upper housing half 56 as by brazing, and opens into the upper chamber 60 of the actuator. The fitting 80 is connected by tubing 84 to a predetermined control pressure for supply to the upper chamber 60 of the actuator 50 for controlling operation of the actuator. More specifically, as shown in FIG. 2, the pressure tubing 84 is connected to the output 83 of a control valve 86. This control valve 86 has one input 88 in open communication with atmospheric pressure, and a second input 90 coupled to the air inlet side (P1c) of the turbocharger compressor 18. A control line 92 functions to couple a control signal to the control valve 86 to switch the output 83 between connection to either one of the inputs 88 and 90. This control line 92 is operated by a pressure switch 94 suitably mounted on the intake manifold 16 (FIG. 1) of the engine 12. Importantly, the control valve 86 and the switch 94 are generally conventional in construction, and may be either pneumatic or electrically controlled. Accordingly, no specific construction details of the switch 94 or the control valve 86 are described herein.

In operation, the manifold switch 94 normally couples the air inlet side of the compressor 18 via the valve input 90 to the upper chamber 60 of the actuator 50. The pressure at the compressor air inlet normally comprises a vacuum which, when compared with the atmospheric pressure in the lower chamber 62, tends to draw the diaphragm 48 upwardly within the actuator 50 as viewed in FIG. 2. During part load engine operation such as relatively steady state cruise conditions the vacuum within the upper chamber 60 is sufficient to overcome the bias of the spring 77 to lift the actuator rod 46 upwardly and thereby move the valve 36 to an open position. In this manner, the actuator opens the bypass flow path 32 to allow passage of engine exhaust gases through the bypass flow path during steady state cruise engine operation. This reduces the backpressure on the engine during such part load operation to result in substantially improved engine efficiency and economy. Conveniently, the openings 68 and 69 at the lower end of the actuator are sufficient to accommodate the necessary angular motion of the actuator rod 46 to pivot the crank arm 42 with respect to the pivot pin 40. Moreover, when the valve 36 is in the open position, the piston 72 within the upper actuator chamber 60 is drawn against the upper housing half 56 to thereby define the extent of opening movement of the valve 36.

During substantially full load operation of the engine, such as occurs during substantial engine acceleration, the vacuum within the intake manifold 16 of the engine 12 tends to approach atmospheric pressure. The switch 94 is provided to sense this change in pressure in the intake manifold, and automatically thereupon to disconnect the input 90 from the actuator 50 and to connect instead the input 88 to the actuator 50. This coupling of atmospheric pressure via the input 88 to the upper chamber 60 of the actuator 50 removes the vacuum within the chamber 60 to allow the spring 77 to return the waste gate valve 36 to a position closing the flow path 32. Closing of the flow path 32 allows the turbocharger to develop rapidly substantial boost pressure for supply to the engine during substantially full load operation. Of course, when full load operation ceases, the switch 94 detects the return of the vacuum within the intake manifold 16 to once again reconnect the vacuum input 90 to the actuator.

In turbochargers, it is desirable to limit the boost or charge air pressure supplied by the compressor 18 to a maximum predetermined magnitude. Importantly, however, the fluid pressure of exhaust gases at the inlet of the turbine 24 is directly proportional to the compressor boost pressure. Accordingly, in the actuator of this invention, the spring force rate provided by the compression spring 77 is carefully chosen in relation to the cross-sectional dimension of the bypass flow path 32 and the waste gate valve 36. The dimensions of the components are designed so that turbine inlet pressure acting directly upon the valve head 36 tends to overcome forces applied by the compression spring 77 whenever compressor discharge pressure reaches a predetermined maximum value. In this manner, when this predetermined threshold is reached, turbine inlet pressure overcomes the spring force to cause the spring 77 to compress and to allow movement of the waste gate valve 36 away from the bypass flow path 32 to open said flow path. Accordingly, the turbocharger control actuator of this invention provides dual control for opening the flow path 32 during part load or cruise engine operation, and also for opening the flow path whenever compressor discharge pressure reaches a predetermined maximum value.

An alternate arrangement of the invention is illustrated schematically in FIG. 3, wherein a turbocharger control actuator 50 and a wastegate valve assembly identical to that shown and described in FIG. 2 are used. In this embodiment, the manifold switch 94 functions to controllably switch the pressure (P1c) at the inlet of the compressor to the turbocharger control actuator 50 directly via a first pressure input 188, or via a second pressure input 190. However, in the embodiment of FIG. 3, the second pressure input 190 includes a check valve 191. In operation, the switch 94 normally connects the compressor inlet pressure (P1c) to the actuator 50 through the check valve 191 whereby a substantial vacuum is drawn in the actuator chamber 60 and is maintained by the check valve. Accordingly, in this embodiment, fluctuations in the compressor inlet pressure do not affect the position of the waste gate valve 36, but instead, the waste gate valve is retained in a wide open position. However, during substantially full load engine operation, the check valve 191 is bypassed via the input 188 to connect a fluctuating compressor inlet pressure to the actuator chamber 60. In this manner, the magnitude of opening of the waste gate valve 36 is directly proportional to the magnitude of vacuum coupled to the actuator. In practice, this magnitude varies, and this pressure is approximately atmospheric pressure during a full load or transient state such that the spring 77 in the actuator functions to move the waste gate valve 36 to close the bypass flow path 32 to allow the turbocharger to develop substantial boost pressure. Importantly, however, the spring 77 and waste gate valve are once again designed to allow turbine inlet pressure to open the valve whenever the turbine inlet pressure exceeds a predetermined maximum value.

Another embodiment of the invention is shown in FIG. 4. In this embodiment, the actuator 50 once again controls the waste gate valve assembly 34 to control the position of a valve 36 with respect to a bypass flow path 32. However, in FIG. 4, the actuator 50 is coupled to compressor inlet pressure (Plc) at all times throughout the various modes of engine operation. In this embodiment, vacuum developed at the compressor inlet functions to urge the waste gate valve head 36 to an open position. However, during substantially full load or transient operation, the vacuum decreases to substantially atmospheric pressure to allow the spring within the actuator to close the waste gate valve. Once again, the spring 77 and valve 36 are designed to allow turbine inlet pressure to overcome the spring forces for opening of the waste gate valve whenever turbine inlet pressure exceeds a maximum predetermined value.

A variety of other modifications to the turbocharge control actuator of this invention are believed to be apparent to those skilled in the art. Accordingly, no limitation of the invention is intended by way of the description herein except as set forth in the appended claims.

What is claimed is:

1. In a turbocharged engine system having an engine, a turbine driven by engine exhaust gases, a compressor driven by the turbine to draw in air for supply to the engine, means forming a bypass flow path for bypass passage of exhaust gases around the turbine, and a waste gate valve for opening and closing the bypass flow path, a turbocharger control actuator, comprising:
   an actuator housing;
   a flexible diaphragm mounted with said housing and cooperating therewith to define a pressure chamber;
   an actuator rod having one end for connection to the waste gate valve to control the position thereof, and its other end movably carried with said diaphragm;
   spring means for urging said actuator rod to retain the waste gate valve in a position closing the bypass flow path; and
   means for supplying a first control pressure to said pressure chamber at part load engine operating conditions, said first control pressure having a magnitude for causing movement of said diaphragm to displace said actuator rod for moving the waste gate valve against said spring means to a position opening the bypass flow path, said supplying means further including switch means for substantially disconnecting said first control pressure from said pressure chamber at substantially full load engine operating conditions and for supplying a second control pressure to said pressure chamber, said second control pressure having a magnitude for causing movement of said diaphragm to displace said actuator rod for moving the waste gate valve to a position closing the bypass flow path, said switch means coupling said pressure chamber to the intake of the compressor during part load engine operating conditions, and coupling said pressure chamber to ambient pressure at substantially full load engine operating conditions.

2. The actuator of claim 1 wherein said spring means comprises a compression spring reacting between said housing and said diaphragm for biasing said diaphragm to move said actuator rod to position the waste gate valve to close the bypass flow path.

3. The actuator of claim 1 including means for limiting the extent of movement of said diaphragm to displace said actuator rod for moving the waste gate valve against said spring means.

4. The actuator of claim 3 wherein said limiting means is mounted for movement with said diaphragm and for engagement with said housing upon movement of said diaphragm to a predetermined position.

5. The actuator of claim 1 wherein said spring means comprises means for applying a force of predetermined magnitude for urging said actuator rod to retain the waste gate valve in a position closing the bypass flow path, said force of predetermined magnitude being overcome by the pressure of exhaust gases acting upon the waste gate valve when the exhaust gas pressure reaches a predetermined magnitude.

6. The actuator of claim 1 wherein said first control pressure comprises a vacuum for drawing said diaphragm in a direction to move said actuator rod against said spring means.

7. The actuator of claim 1 wherein said control pressure supplying means comprises means for supplying a vacuum to said pressure chamber at part load engine operating conditions for drawing said diaphragm in a direction to move said actuator rod against said spring means, and for supplying substantially atmospheric pressure to said pressure chamber at substantially full load engine operating conditions.

8. The actuator of claim 1 wherein said switch means comprises a valve member having an outlet coupled to said pressure chamber, a first inlet coupled to the intake of the compressor, and a second inlet coupled to ambient pressure, and a pressure switch responsive to the pressure of air supplied to the engine for selectively coupling said outlet of said valve member to one of the first and second inlets.

9. In a turbocharged engine system having an engine, a turbine driven by engine exhaust gases, means forming a bypass flow path for bypass passage of exhaust gases around the turbine, a waste gate valve for opening and closing the bypass flow path, and a compressor driven by the turbine to draw in and compress ambient air for supply to the engine, a turbocharger control actuator, comprising:
   an actuator housing;
   a flexible diaphragm mounted with said housing and cooperating therewith to define a pressure chamber;
   an actuator rod having one end for connection to the waste gate valve to control the position thereof, and its other end movably carried with said diaphragm;
   spring means for urging said actuator rod to retain the waste gate valve in a position closing the bypass flow path; and
   means for coupling said pressure chamber to the intake of the compressor, said coupling means including means for selectively coupling a one-way check valve between the intake of the compressor and said pressure chamber during part load engine operating conditions, and for coupling the intake of the compressor directly to said pressure chamber during substantially full load engine operating conditions.

10. The actuator of claim 9 wherein said selective coupling means comprises switch means responsive to engine operating conditions.

11. The actuator of claim 10 wherein said switch means comprises a valve member having an outlet coupled to said pressure chamber, a first inlet coupled directly to the intake of the compressor, and a second inlet coupled through said check valve to the intake of the compressor, and a pressure switch responsive to the pressure of air supplied to the engine for selectively coupling the outlet of said valve member to one of said first and second inlets.

12. In a turbocharged engine system having an engine, a turbine driven by engine exhaust gases, means forming a bypass flow path for bypass passage of exhaust gases around the turbine, a waste gate valve for opening and closing the bypass passage, and a compressor driven by the turbine to draw in and compress ambient air for supply to the engine, a turbocharger control actuator comprising:

an actuator housing;
a flexible diaphragm mounted within said housing and cooperating therewith to define a pressure chamber;
an actuator rod having one end for connection to the waste gate valve to control the position thereof, and its other end movably carried by said diaphragm;
spring means for applying a spring force of predetermined magnitude to said actuator rod for urging said actuator rod to retain the waste gate valve in a position closing the bypass flow path, said force being overcome by the pressure of exhaust gases acting upon the waste gate valve when the exhaust gas pressure reaches a predetermined magnitude; and
means for coupling said pressure chamber to the intake of the compressor during part load engine operating conditions for causing movement of said diaphragm to displace said actuator rod for moving the waste gate valve against said spring means to a position opening the bypass flow path, and for disconnecting said pressure chamber from the intake of the compressor and for coupling said pressure chamber to ambient pressure at substantially full load engine operating conditions for causing movement of said diaphragm to displace said actuator rod for moving the waste gate valve toward a position closing the bypass flow path.

13. The actuator of claim 12 wherein said coupling means includes switch means responsive to engine operating conditions for selectively coupling said pressure chamber between the intake of the compressor and ambient pressure.

14. The actuator of claim 13 wherein said switch means comprises a valve member having an outlet coupled to said pressure chamber, a first inlet coupled to the intake of the compressor, and a second inlet coupled to ambient pressure, and a pressure switch responsive to the pressure of air supplied to the engine for selectively coupling the outlet of said valve member to one of the first and second inlets.

15. In a turbocharged engine system having an engine, a turbine driven by engine exhaust gases, means forming a bypass flow path for bypass passage of exhaust gases around the turbine, a waste gate valve for opening and closing the bypass passage, and a compressor driven by the turbine to draw in and compress ambient air for supply to the engine, a turbocharger control actuator comprising:

an actuator housing;
a flexible diaphragm mounted within said housing and cooperating therewith to define a pressure chamber;
an actuator rod having one end for connection to the waste gate valve to control the position thereof, and its other end movably carried by said diaphragm;
spring means for applying a spring force of predetermined magnitude to said actuator rod for urging said actuator rod to retain the waste gate valve in a position closing the bypass flow path, said force being overcome by the pressure of exhaust gases acting upon the waste gate valve when the exhaust gas pressure reaches a predetermined magnitude; and
means for coupling said pressure chamber to the intake of the compressor, said coupling means including means for selectively coupling a one-way check valve between the intake of the compressor and said pressure chamber during part load engine operating conditions for causing movement of said diaphragm to displace said actuator rod for moving the waste gate valve against said spring means to a position opening the bypass flow path, and for coupling the intake of the compressor directly to said pressure chamber during substantially full load engine operating conditions for causing movement of said diaphragm to displace said actuator rod for moving the waste gate valve toward a position closing the bypass flow path.

16. The actuator of claim 15 wherein said selective coupling means comprises switch means responsive to engine operating conditions.

17. The actuator of claim 16 wherein said switch means comprises a valve member having an outlet coupled to said pressure chamber, a first inlet coupled directly to the intake of the compressor, and a second inlet coupled through said check valve to the intake of the compressor, and a pressure switch responsive to the pressure of air supplied to the engine for selectively coupling the outlet of said valve member to one of said first and second inlets.

18. In a turbocharged engine system having an engine, a turbine driven by engine exhaust gases, means forming a bypass flow path for bypass passage of exhaust gases around the turbine, a waste gate valve for opening and closing the bypass passage, and a compressor driven by the turbine to draw in and compress ambient air for supply to the engine, a turbocharger control actuator comprising:

an actuator housing;
a flexible diaphragm mounted within said housing and cooperating therewith to define a pressure chamber;
an actuator rod having one end for connection to the waste gate valve to control the position thereof, and its other end movably carried by said diaphragm;
spring means for applying a spring force of predetermined magnitude to said actutor rod for urging said actuator rod to retain the waste gate valve in a position closing the bypass flow path, said force being overcome by the pressure of exhaust gases acting upon the waste gate valve when the exhaust gas pressure reaches a predetermined magnitude; and a valve member having an outlet coupled to said pressure chamber, a first inlet coupled to the intake of the compressor, and a second inlet coupled to ambient pressure; and a pressure switch responsive to the pressure of air supplied to the engine for selectively coupling the outlet of said valve member to said first inlet during part load engine operating conditions for causing movement of said diaphragm to displace said actuator rod for moving the waste gate valve against said spring means to a position opening the bypass flow path, and for coupling the outlet of said valve member to said second inlet during substantially full load engine operating conditions for allowing said spring means to urge said actuator rod to a position retaining the waste gate valve closing the bypass flow path.

19. In a turbocharged engine system having an engine, a turbine driven by engine exhaust gases, means forming a bypass flow path for bypass passage of exhaust gases around the turbine, a waste gate valve for opening and closing the bypass passage, and a compressor driven by the turbine to draw in and compress ambient air for supply to the engine, a turbocharger control actuator comprising:

an actuator housing;

a flexible diaphragm mounted within said housing and cooperating therewith to define a pressure chamber;

an actuator rod having one end for connection to the waste gate valve to control the position thereof, and its other end movably carried by said diaphragm;

spring means for applying a spring force of predetermined magnitude to said actuator rod for urging said actuator rod to retain the waste gate valve in a position closing the bypass flow path, said force being overcome by the pressure of exhaust gases acting upon the waste gate valve when the exhaust gas pressure reaches a predetermined magnitude; and a valve member having an outlet coupled to said pressure chamber, a first inlet coupled directly to the intake of the compressor, and a second inlet coupled to the intake of the compressor through a one-way check valve; and a pressure switch responsive to the pressure of air supplied to the engine for selectively coupling the outlet of said valve member to said second inlet during part load engine operating conditions for causing movement of said diaphragm to displace said actuator rod for moving the waste gate valve against the spring means to a position opening the bypass flow path, and for coupling the outlet of said valve member to said first inlet during substantially full load engine operating conditions for allowing said spring means to urge said actuator rod to a position retaining the waste gate valve closing the bypass flow path.

20. In a turbocharged engine system having an engine, a turbine driven by engine exhaust gases, means forming a bypass flow path for bypass passage of exhaust gases around the turbine, and a waste gate valve for opening and closing the bypass flow path, a method of controlling the position of the waste gate valve comprising the steps of:

connecting the waste gate valve to one end of an actuator rod having its other end movably carried by a flexible diaphragm mounted in a housing to define one wall of a housing pressure chamber;

biasing the actuator rod with spring means to a position retaining the waste gate valve in a position closing the bypass flow path;

coupling to the pressure chamber a first control pressure having a magnitude during part load engine operating conditions for moving the diaphragm to displace the actuator against the spring means to move the waste gate valve to a position opening the bypass flow path wherein said control pressure coupling step during part load engine operation comprises coupling a vacuum to the pressure chamber for drawing the diaphragm in a direction to move the actuator rod against the spring means; and disconnecting the pressure chamber from the first control pressure during substantially full load engine operating conditions and coupling the pressure chamber to a second control pressure having a magnitude for moving the diaphragm to displace the actuator rod to move the waste gate valve to a position closing the bypass flow path wherein said disconnecting step comprises removing the vacuum from the pressure chamber during substantially full load engine operating conditions and coupling the pressure chamber to ambient pressure.

21. In a turbocharged engine system having an engine, a turbine driven by engine exhaust gases, a compressor driven by the turbine to draw in and compress ambient air for supply to the engine, means forming a bypass flow path for bypass passage of exhaust gases around the turbine, and a waste gate valve for opening and closing the bypass flow path, a method of controlling the position of the waste gate valve comprising the steps of:

connecting the waste gate valve to one end of an actuator rod having its other end movably carried by a flexible diaphragm mounted in a housing to define one wall of a housing pressure chamber;

biasing the actuator rod with spring means to a position retaining the waste gate valve in a position closing the bypass flow path;

coupling to the pressure chamber a first control pressure having a magnitude during part load engine operating conditions for moving the diaphragm to displace the actuator against the spring means to move the waste gate valve to a position opening the bypass flow path, said control pressure coupling step during part load engine operation comprising coupling the pressure chamber to the intake of the compressor; and disconnecting the pressure chamber from the first control pressure during substantially full load engine operating conditions and coupling the pressure chamber to a second control pressure having a magnitude for moving the diaphragm to displace the actuator rod to move the waste gate valve to a position closing the bypass flow path, wherein said disconnecting step comprises disconnecting the intake of the compressor from the pressure chamber during substantially full load engine operating conditions, and coupling ambient pressure to the pressure chamber during substantially full load engine operating conditions.

22. In a turbocharged engine system having an engine, a turbine driven by engine exhaust gases, means forming a bypass flow path for bypass passage of exhaust gases around the turbine, and a waste gate valve for opening and closing the bypass flow path, a method of controlling the position of the waste gate valve comprising the steps of:

connecting the waste gate valve to one end of an actuator rod having its other end movably carried by a flexible diaphragm mounted in a housing to define one wall of a housing pressure chamber;

biasing the actuator rod with spring means to a position retaining the waste gate valve in a position closing the bypass flow path; and coupling to the pressure chamber a control pressure, said coupling step including coupling the pressure chamber to the intake of the compressor through a one-way check valve during part load engine operating conditions to draw and maintain a substantial vacuum in the pressure chamber for moving the diaphragm to displace the actuator against the spring means to move the waste gate valve to a position opening the bypass flow path, and coupling the pressure chamber directly to the intake of the compressor during substantially full load engine operating conditions for causing movement of said diaphragm to displace said actuator rod for moving the waste gate valve toward a position closing the bypass flow path.

23. In a turbocharged engine system having an engine, a turbine driven by engine exhaust gases, means forming a bypass flow path for bypass passage of exhaust gases around the turbine, a waste gate valve for opening and closing the bypass passage, and a compressor driven by the turbine to draw in a compress ambient air for supply to the engine, a method of controlling the position of the waste gate valve comprising the steps of:

connecting the waste gate valve to one end of an actuator rod having its other end movably carried by a flexible diaphragm mounted in a housing to define one wall of a housing pressure chamber;

biasing the actuator rod with spring means for applying a spring force of predetermined magnitude to a position for retaining the waste gate valve in a position closing the bypass flow path, the spring force having a magnitude to be overcome by the pressure of exhaust gases acting upon the waste gate valve when the exhaust gas pressure reaches a predetermined magnitude;

coupling the intake of the compressor to the pressure chamber during part load engine operating conditions for moving the diaphragm to displace the actuator against the spring means to move the waste gate valve to a position opening the bypass flow path; and disconnecting the intake from the pressure chamber and coupling ambient pressure to the pressure chamber during substantially full load engine operating conditions to allow the spring force to move the actuator rod for retaining the waste gate valve in a position closing the bypass flow path.

24. In a turbocharged engine system having an engine, a turbine driven by engine exhaust gases, means forming a bypass flow path for bypass passage of exhaust gases around the turbine, a waste gate valve for opening and closing the bypass passage, and a compressor driven by the turbine to draw in and compress ambient air for supply to the engine, a method of controlling the position of the waste gate valve comprising the steps of:

connecting the waste gate valve to one end of an actuator rod having its other end movably carried by a flexible diaphragm mounted in a housing to define one wall of a housing pressure chamber;

biasing the actuator rod with spring means for applying a spring force of predetermined magnitude to a position for retaining the waste gate valve in a position closing the bypass flow path, the spring force having a magnitude to be overcome by the pressure of exhaust gases acting upon the waste gate valve when the exhaust gas pressure reaches a predetermined magnitude;

coupling the pressure chamber to the intake of the compressor through a one-way check valve during part load engine operating conditions to draw and maintain a substantial vacuum in the presure chamber to move the diaphragm to displace the actuator rod against the spring means to move the waste gate valve to a position opening the bypass flow path; and coupling the pressure chamber directly to the intake of the compressor during substantially full load engine operating conditions to allow the spring force to move the actuator rod for retaining the waste gate valve in a position closing the bypass flow path.

* * * * *